United States Patent [19]
Hole

[11] 3,780,641
[45] Dec. 25, 1973

[54] METHOD FOR PREPARING PINEAPPLE

[76] Inventor: William L. Hole, 23 Brookdale Ct., Lafayette, Calif. 94549

[22] Filed: Dec. 6, 1971

[21] Appl. No.: 204,912

[52] U.S. Cl.................... 426/482, 29/559, 99/550, 426/518
[51] Int. Cl. ....... A23n 7/00, B23q 3/08, A47i 17/10
[58] Field of Search.................... 99/233.11, 233.12, 99/549, 550; 29/559

[56] References Cited
UNITED STATES PATENTS

| | | | |
|---|---|---|---|
| 3,473,588 | 10/1969 | Loveland | 93/233.12 |
| 3,528,470 | 9/1970 | DeBack | 93/233.12 |
| 2,969,867 | 1/1961 | McClelland | 99/550 X |
| 3,232,328 | 2/1966 | Anbery | 99/549 X |
| 3,236,276 | 2/1966 | Farmer | 99/233.12 |
| 3,295,573 | 1/1967 | Healy | 99/549 |
| 2,023,810 | 12/1935 | Horner | 99/233.12 |
| 2,652,915 | 9/1953 | Fox | 99/550 X |
| 3,351,114 | 11/1967 | Anderson | 99/233.11 |

Primary Examiner—Wayne A. Morse, Jr.
Attorney—Paul D. Flehr et al.

[57] ABSTRACT

Method and apparatus for preparing fresh pineapple and like fruit prior to slicing and canning or freezing such fruit. Whole pineapple are gripped in sequence intermediate their ends while skin is removed from such ends, after which their core is removed. Following trimming to predetermined length the external grip is released and the pineapple are supported internally while the remaining skin is removed and the pineapple are cut to cylindrical form of predetermined diameter. The removed skin, core and meat cuttings are utilized to the maximum extent to insure minimum waste in an economical procedure.

15 Claims, 22 Drawing Figures

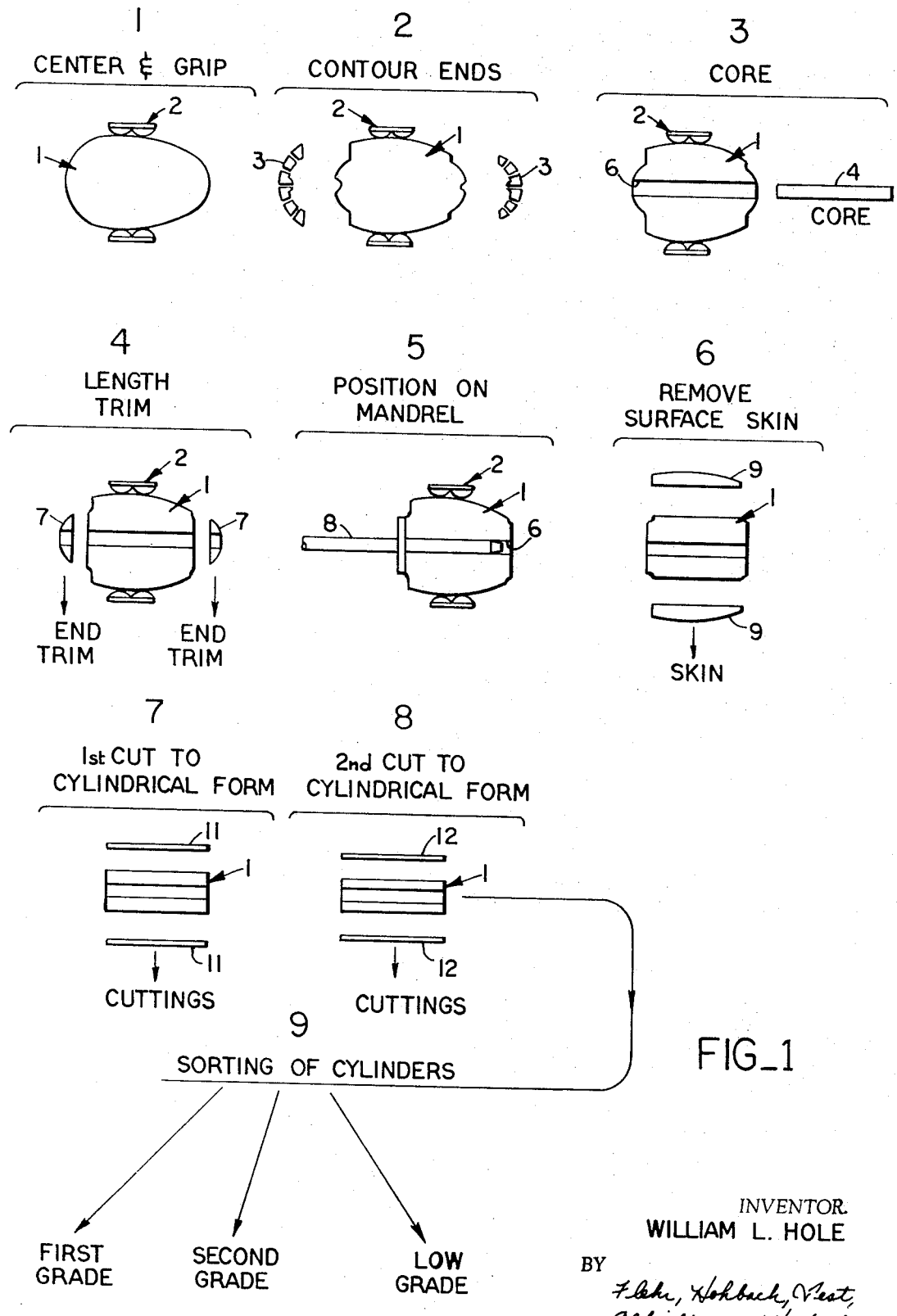

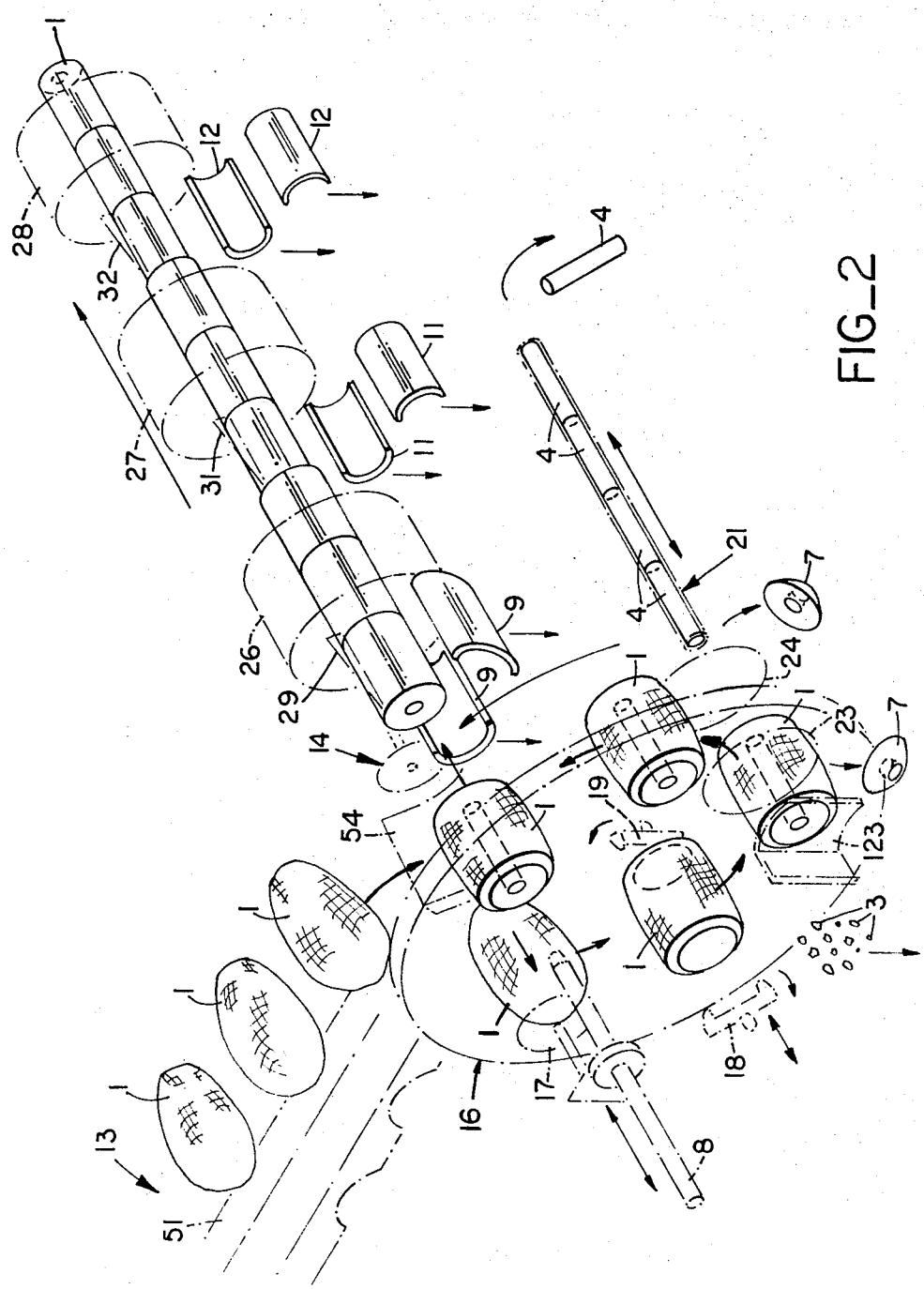
FIG_2

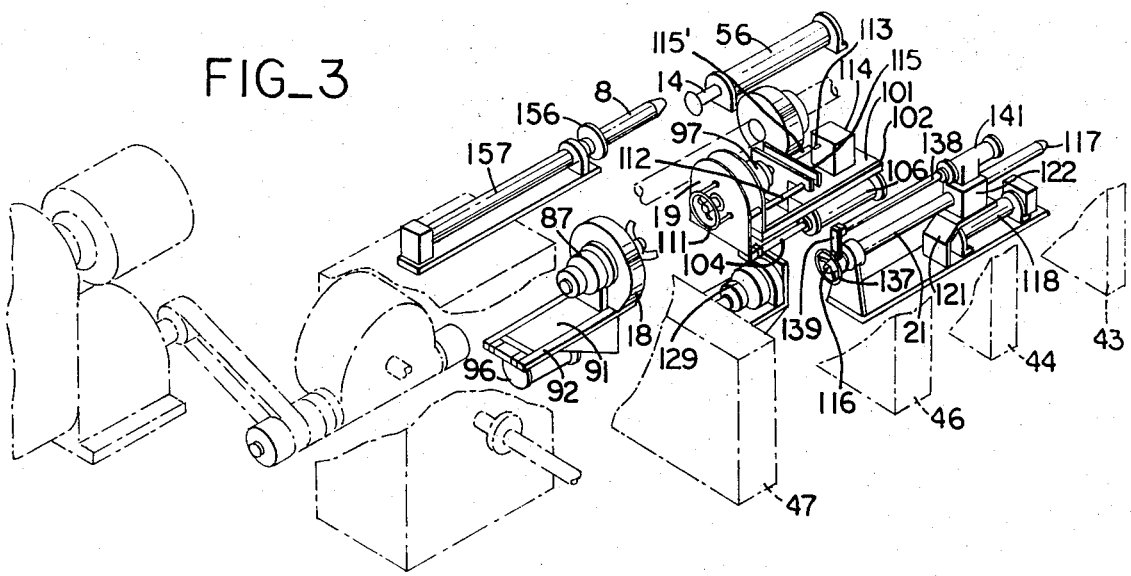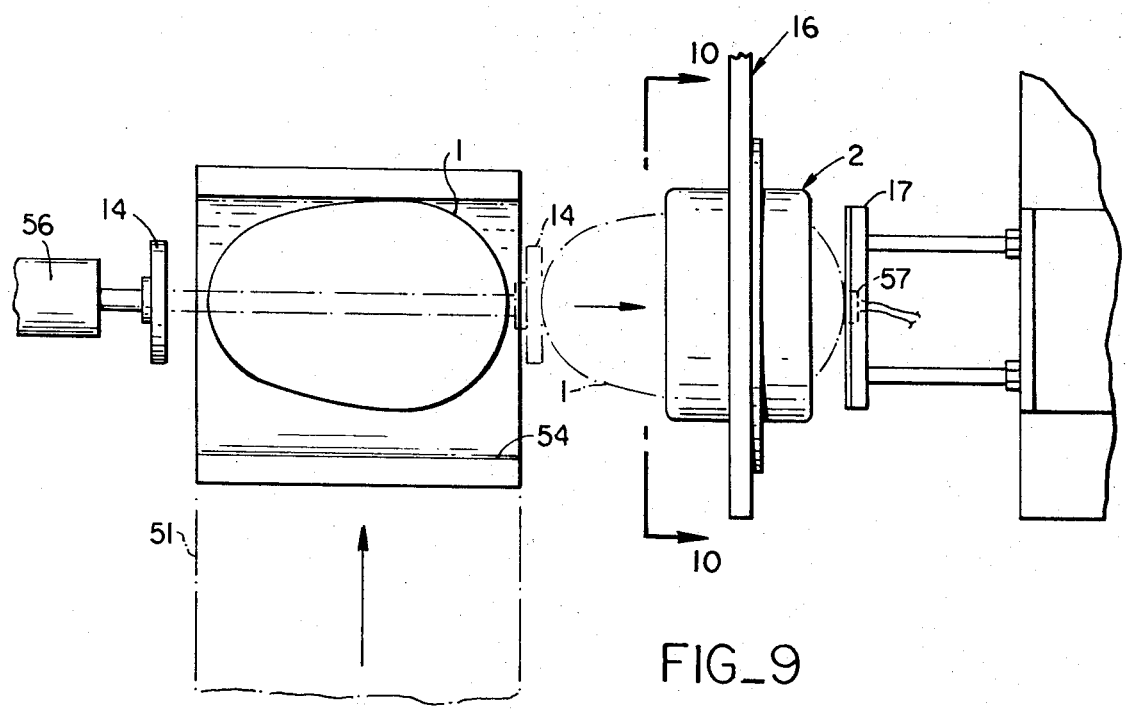

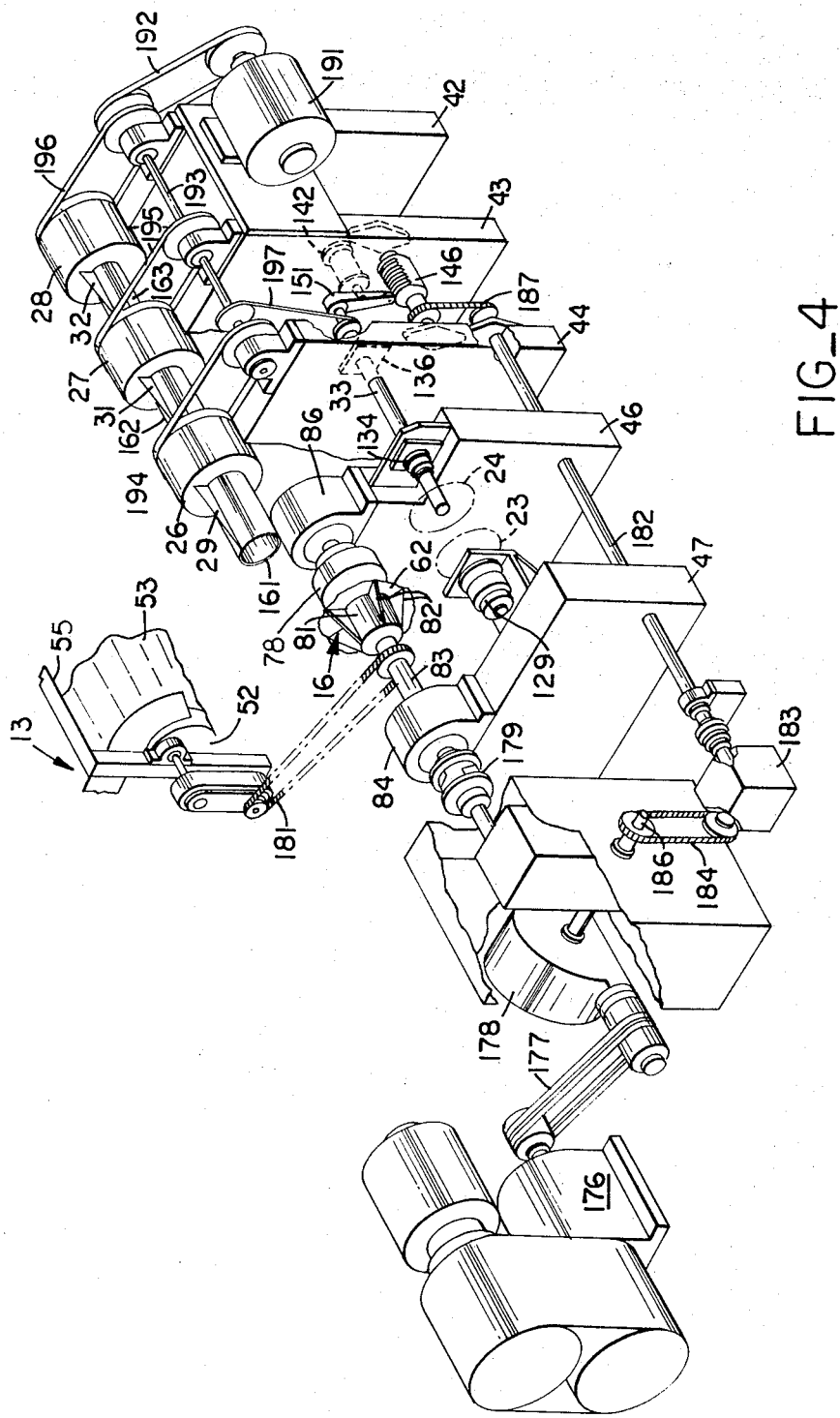
FIG_4

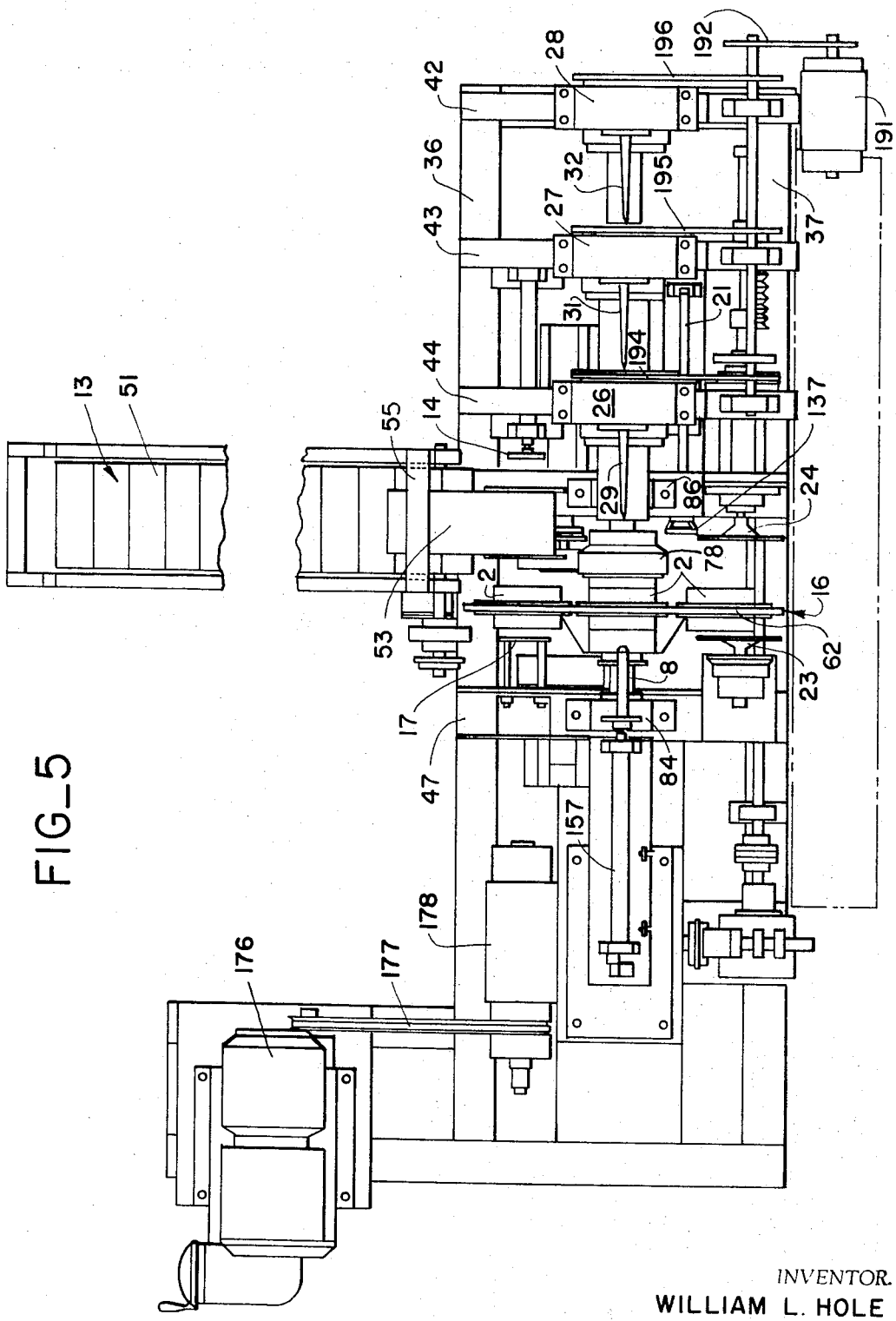
FIG_5

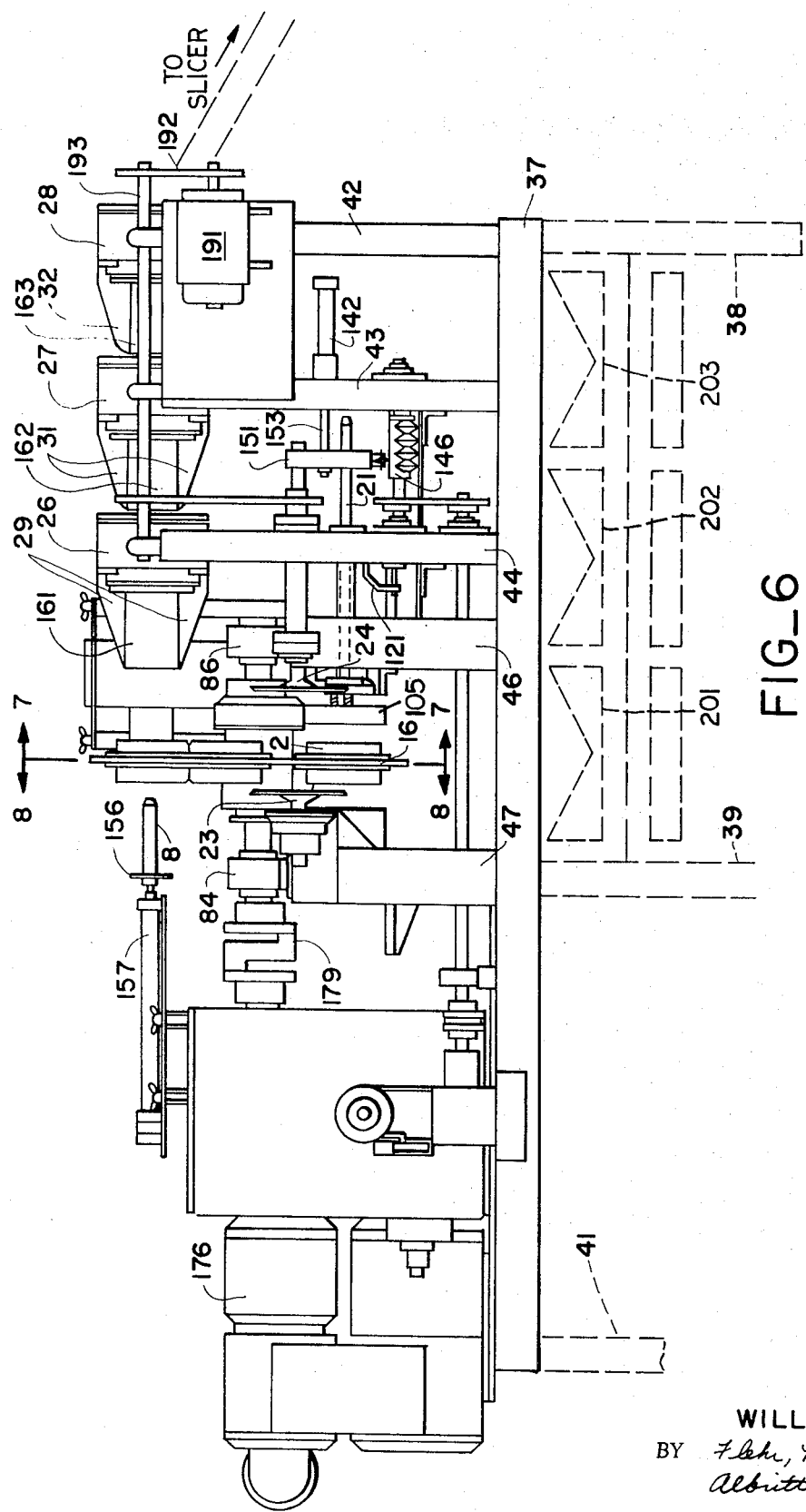

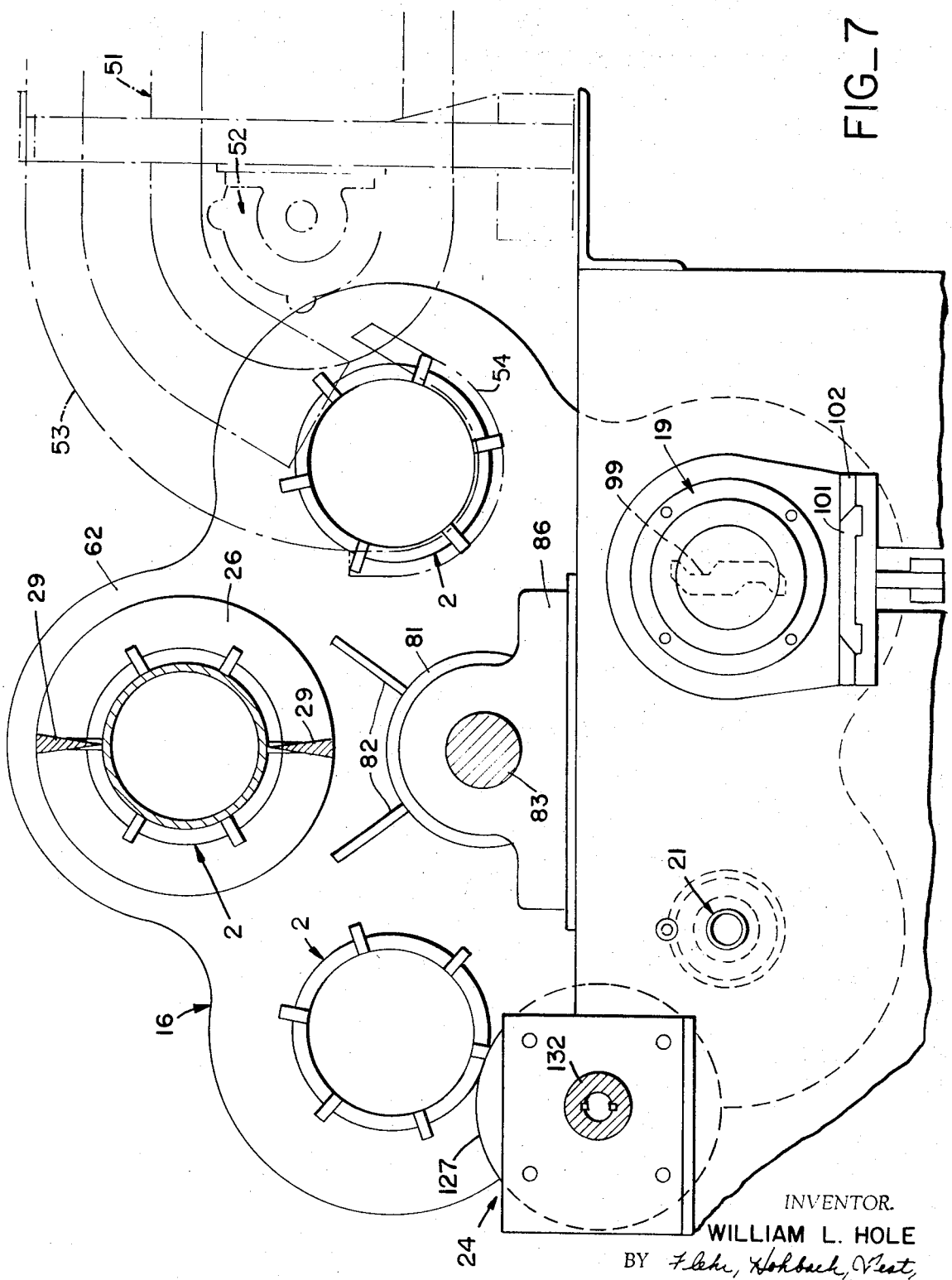

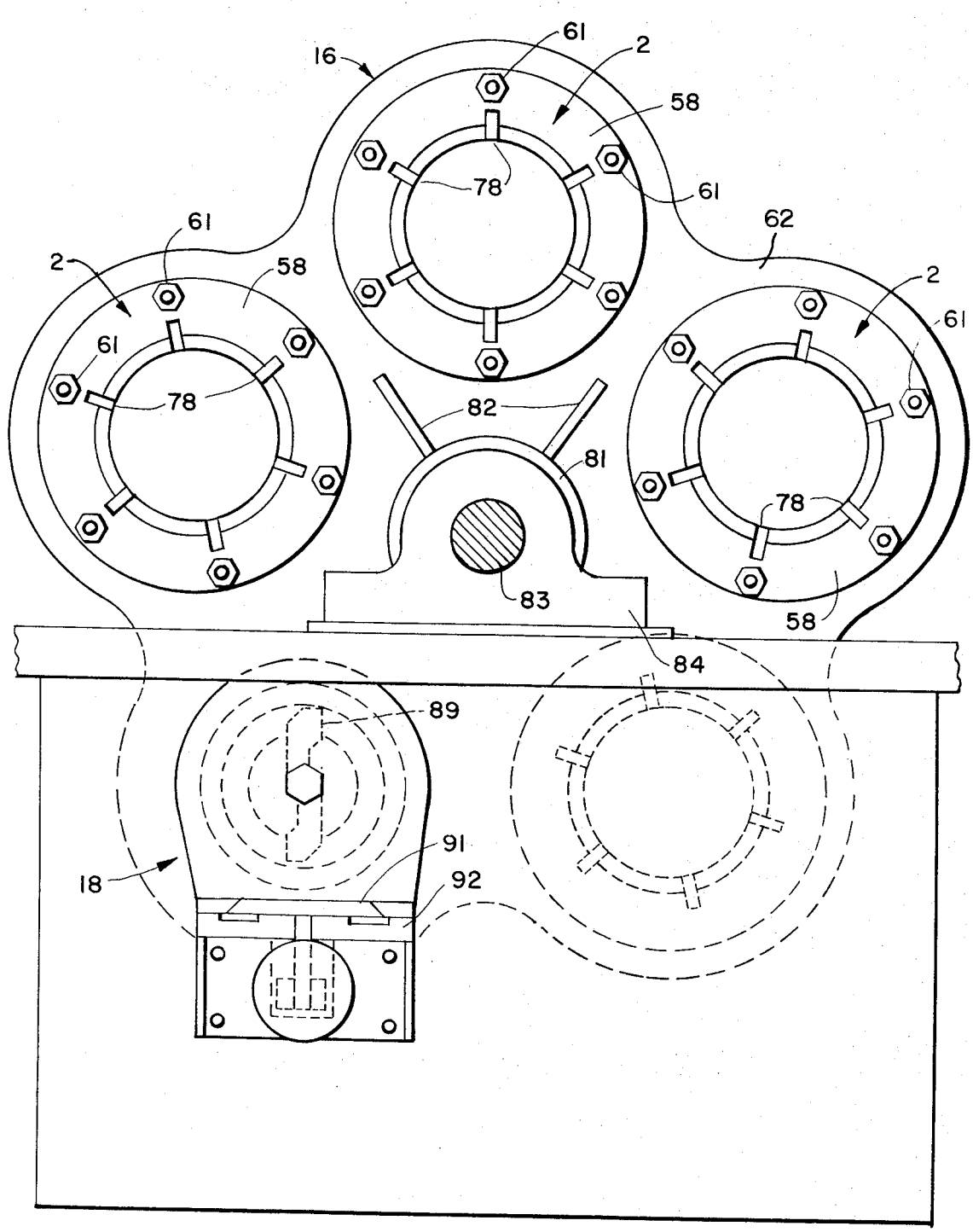
FIG_8

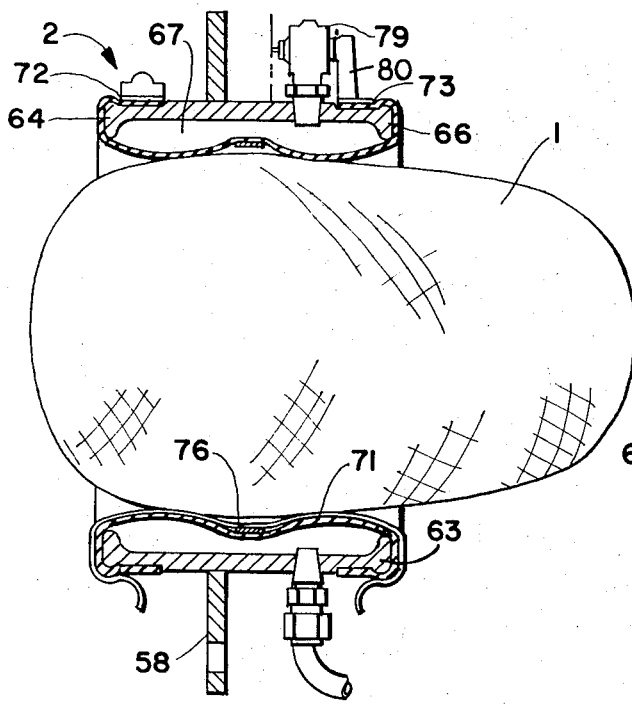
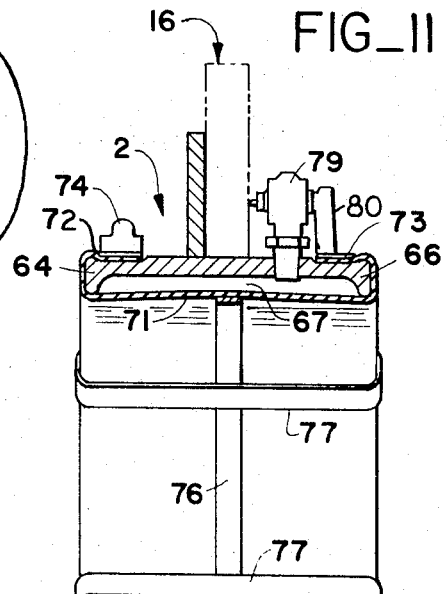
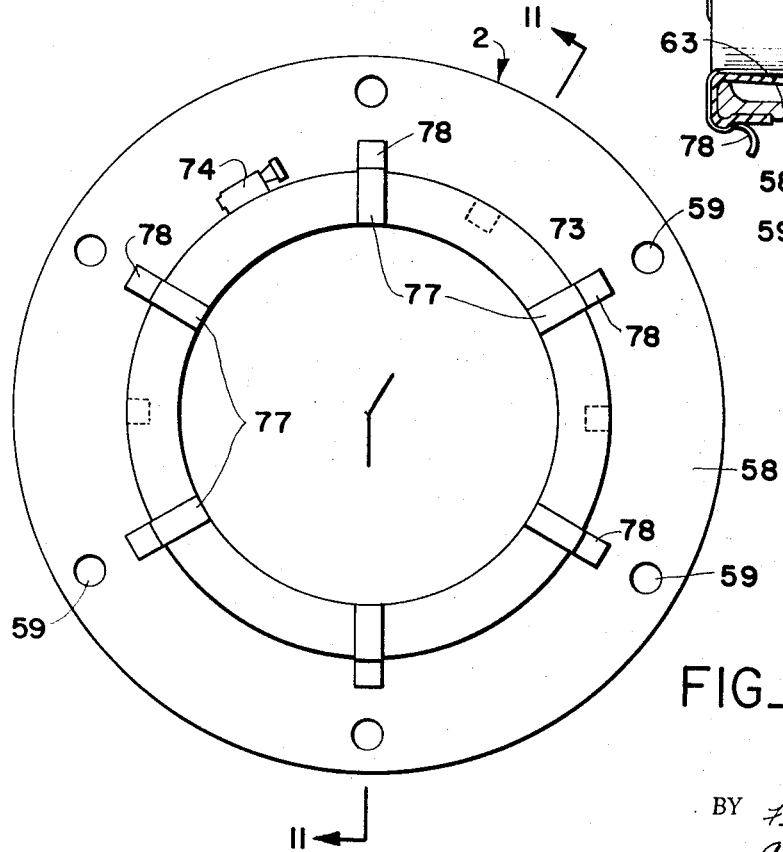

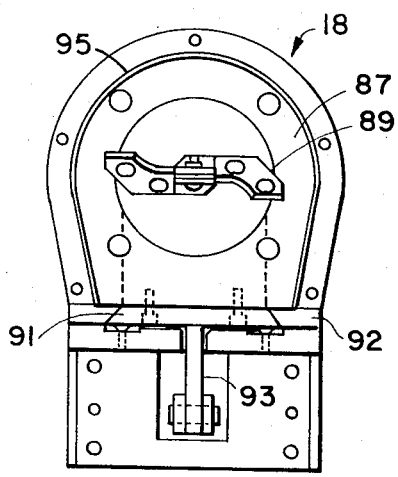
FIG_16
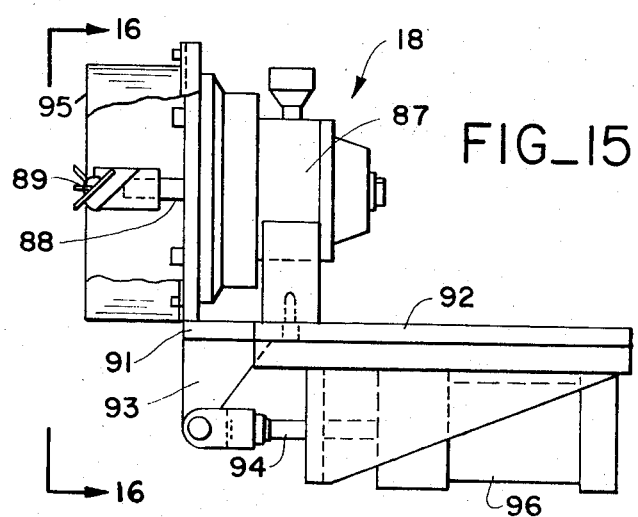
FIG_15
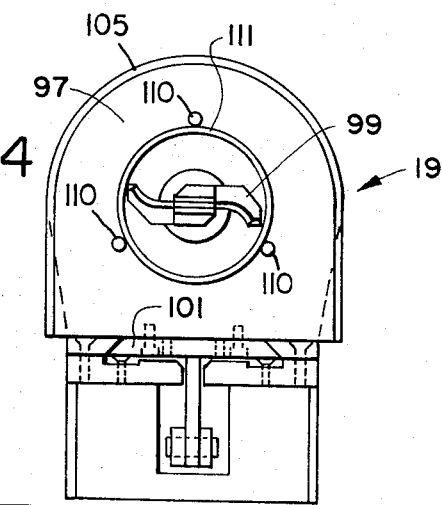
FIG_14
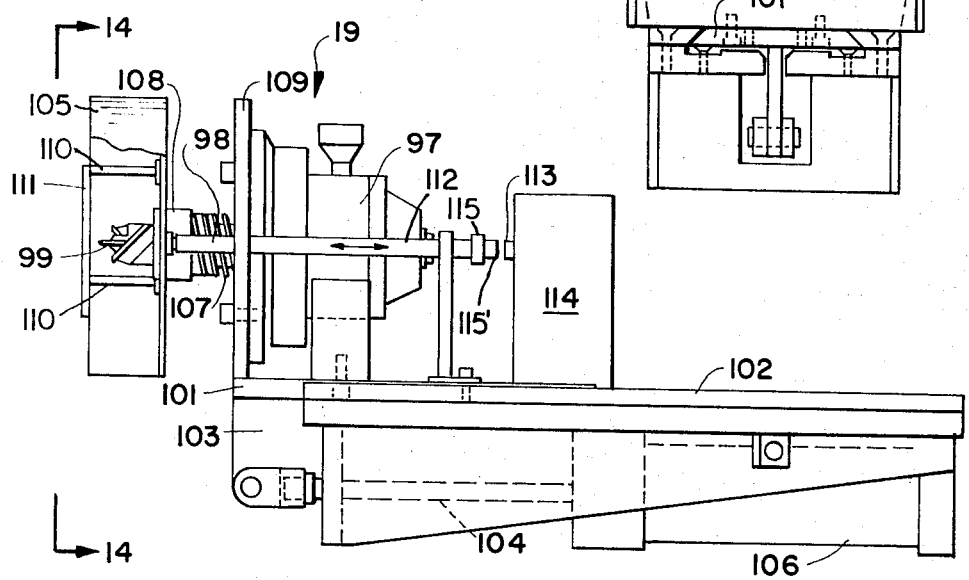
FIG_13
INVENTOR.
WILLIAM L. HOLE
ATTORNEYS

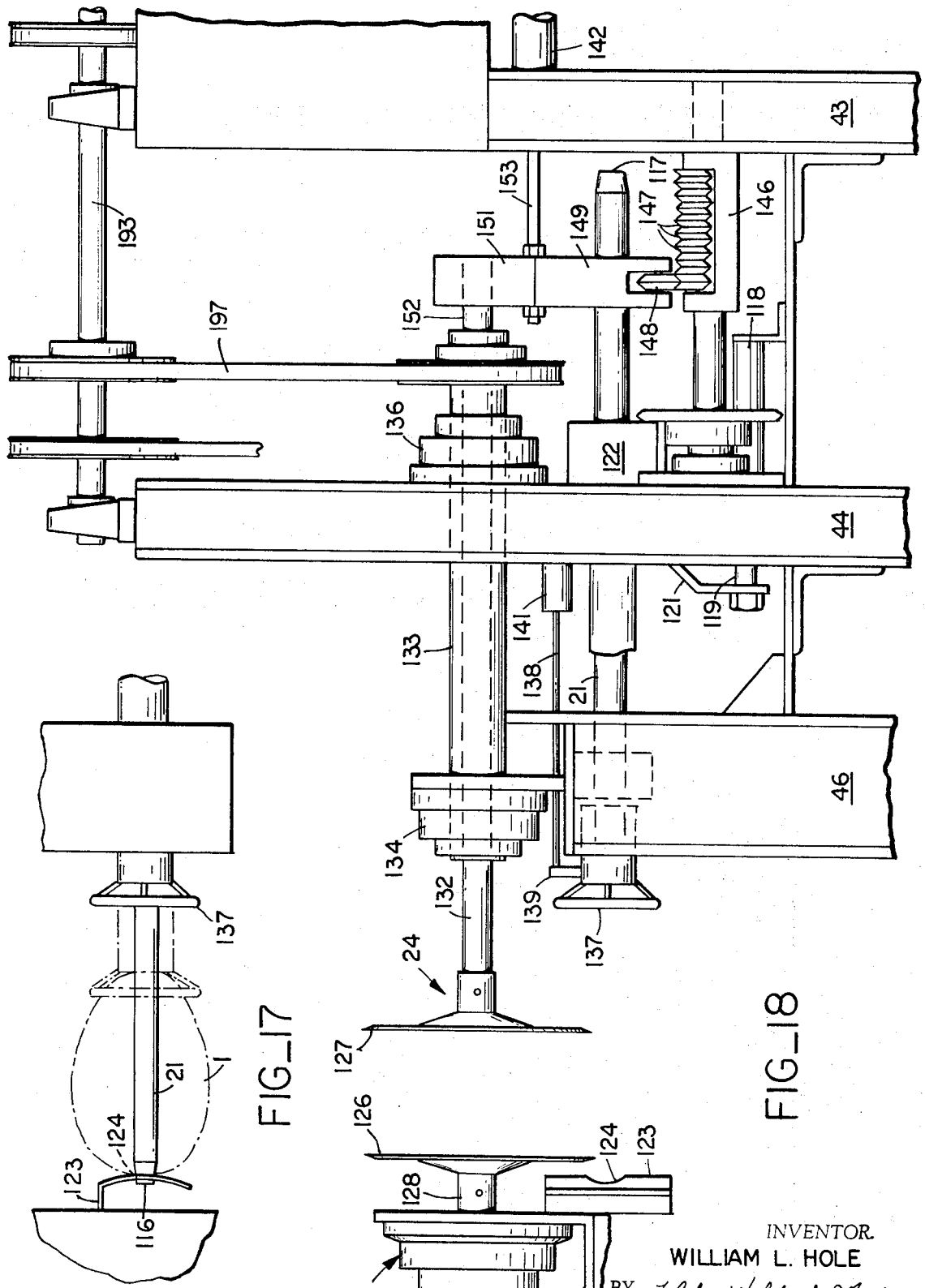

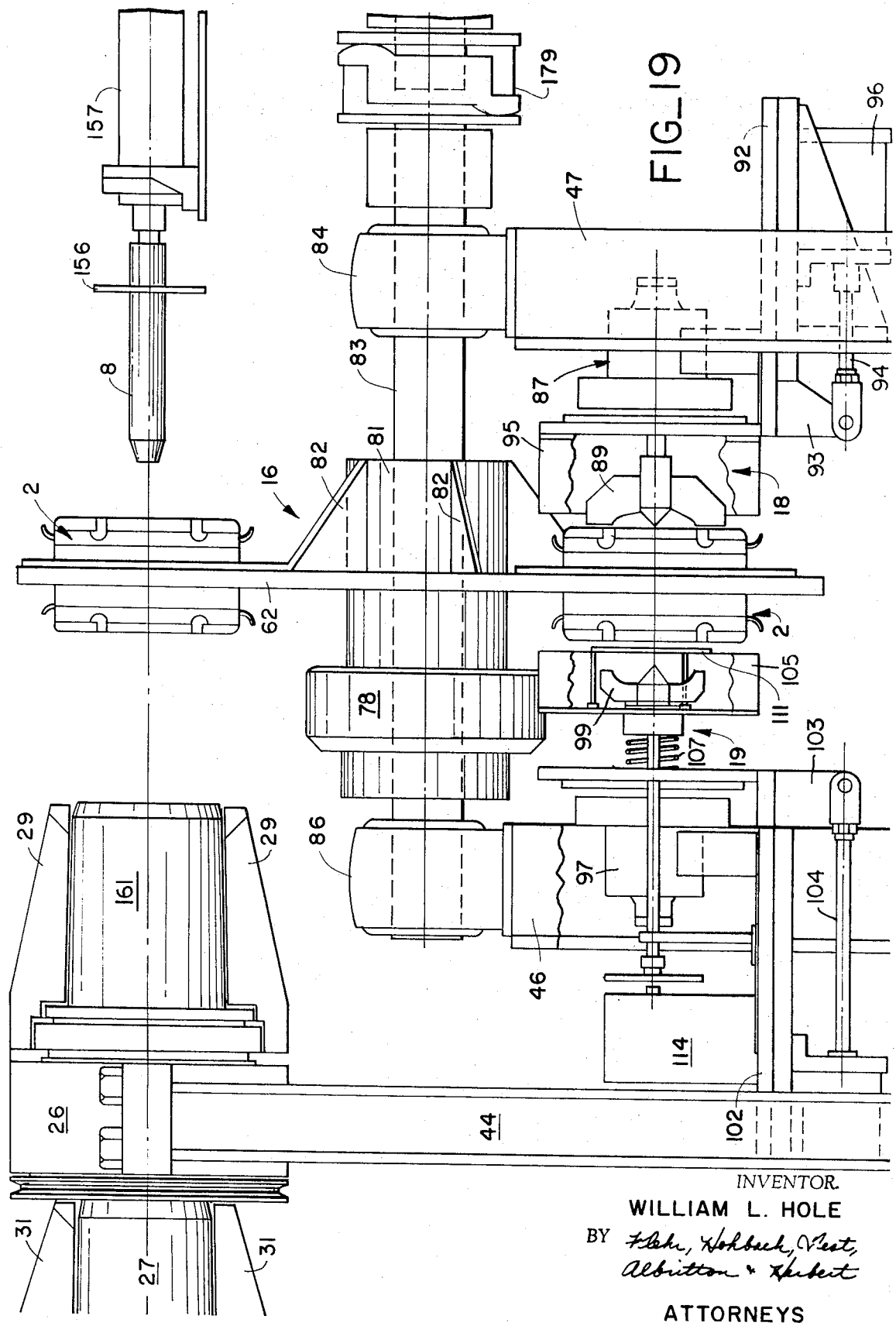

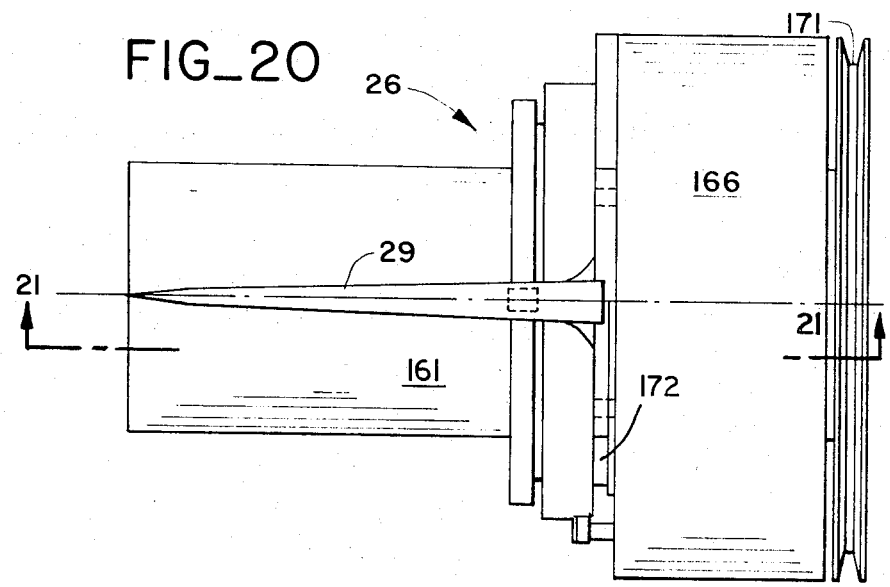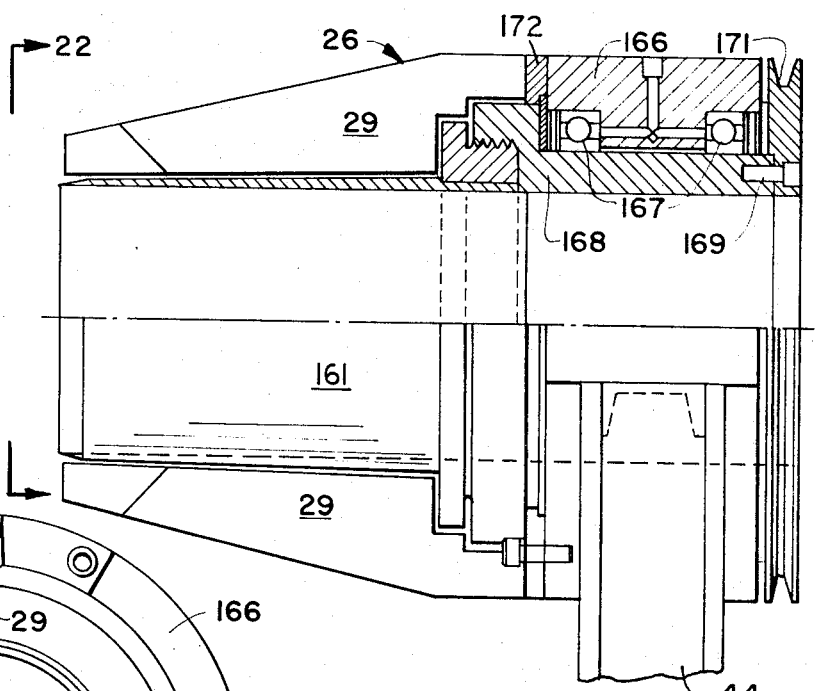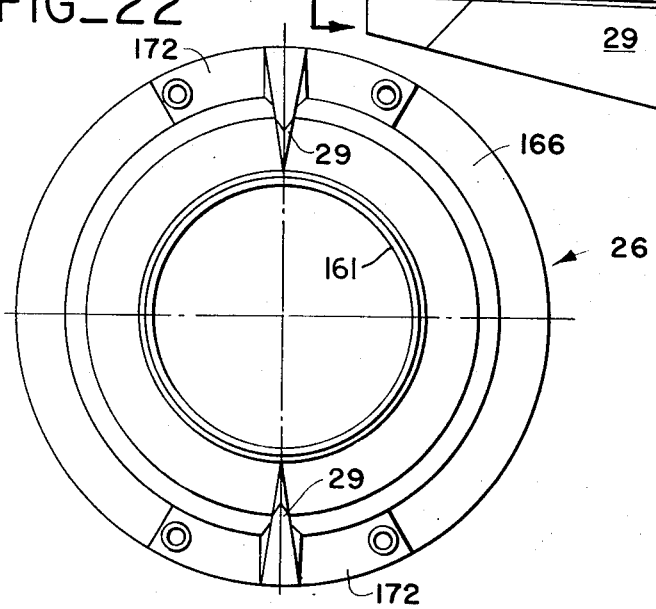

METHOD FOR PREPARING PINEAPPLE

BACKGROUND OF THE INVENTION

1. Field of the Invention

This invention relates to the field of preparing fresh pineapple or like fruit for market, and particularly to the preparation of such fruit prior to slicing and canning, freezing or other processing thereof. The field of this invention relates specifically to a method of preparing pineapple and to mechanical apparatus for carrying out such method in a substantially continuous and economical operation in which fruit is withdrawn from a supply thereof and processed at predetermined stations in a series of treating operations requiring no manual handling of the fruit. The process is interrupted only periodically as pineapple being treated are indexed briefly at successive stations as required to permit individual operations to be performed thereon at such stations.

2. Description of the Prior Art

Although pineapple has been very popular for many years, preparation of such fruit for market has been carried on over the years in a semi-mechanized procedure in which substantial hand labor has been involved. Rising labor costs have dictated that preparation of pineapple and like fruit should be automated to the fullest extent possible. However, over the years, procedures for preparing pineapple have remained largely unchanged and heretofore a fully automatic pineapple treating method and apparatus have not been developed which are suitable for commercial operations.

While certain general aspects of pineapple production have been automated previously, such as centering the fruit and cutting the same to cylindrical form of suitable predetermined size for slicing, an integrated entirely mechanized procedure for handling and treating fresh pineapple following sorting thereof into groups of generally uniform diameter has not been known heretofore. Prior known procedures produced less than maximum recovery of the solid meat of the pineapple, due primarily to waste encountered in heretofore known cutting and trimming operations, both of which tended to decrease the desirable yield of solid meat suitable for slicing in favor of meat better suited for crushing and juicing which is of lesser relative value.

Machines which semi-automated the pineapple treating procedure heretofore are known in the trade as Ginaca machines which utilize various procedures and mechanisms such as shown in patents to Ginaca; 1,060,247 dated Apr. 29, 1913; 1,060,248 dated Apr. 29, 1913; 1,060,250 dated Apr. 29, 1913; and 1,112,130 dated Sept. 29, 1914. While attempts over the years have been made to improve on aspects of the Ginaca machine, such as disclosed in Taylor; 2,034,160 dated Mar. 17, 1936, as noted previously no such attempts have been successful in producing a commercially acceptable method and machine for automatically handling pineapple in a fully mechanized procedure capable of preparing pineapple in ready to slice form. Because of present market considerations, maximum utilization of pineapple meat in solid form, as opposed to crushed or juice form, is particularly desirable. The present invention is particularly effective in eliminating manual handling of fresh fruit while insuring maximum recovery of solid meat therefrom.

SUMMARY OF THE INVENTION

This invention relates generally to a method for preparing fresh pineapple and like fruit and to a machine for carrying out such method in a fully automatic operation which is substantially continuous and interrupted only sequentially and briefly to permit performance of specific operational steps at predetermined stations. More particularly, this invention relates to an apparatus and method for preparing fresh pineapple by removing the skins therefrom, coring the same, and cutting the pineapple to cylindrical form of predetermined length and diameter. In that latter regard, the diameter is selected in accordance with established canning or like procedures and the length is selected to conform to multiples of the predetermined thickness of individual slices to be cut therefrom when the meat is intended for slicing prior to canning or other processing.

This invention further relates to method steps and machine assemblies for effectively supporting the fruit while the same is being skinned, cored and cut to size, and to coring, trimming and sizing cutters utilizable in conjunction with such improved means for supporting the fruit.

From the foregoing, it should be understood that objects of this invention include: the provision of an improved method for preparing pineapple or like fruit for canning and like procedures in preparation for marketing thereof; the provision of an automatic machine for mechanically carrying out processing of pineapple during preparation thereof for market; the provision of improved means for grasping pineapple externally thereof during certain sequences of the treating procedure and for supporting pineapple internally thereof during other sequences of such procedure; and the provision of improved means for automatically trimming pineapple to predetermined lengths and cutting the same to cylindrical form of predetermined diameters.

These and other objects of this invention will become apparent from a study of the following detailed description in which preferred embodiments of the method and apparatus hereof are set out with reference to the accompanying drawings.

BRIEF DESCRIPTION OF THE DRAWINGS

FIG. 1 is a schematic diagram illustrating procedural steps employed in the subject pineapple treating method.

FIG. 2 is a schematic illustration of the sequence of treating steps carried out at predetermined stations of the subject machine.

FIG. 3 is an isometric view, generally schematic in nature, illustrating the operational relationship between various components of the subject machine.

FIG. 4 is an isometric view, generally schematic in nature, illustrating the operational relationship between other components of the subject machine.

FIG. 5 is a plan view of the subject machine.

FIG. 6 is a side elevational view of the subject machine.

FIGS. 7 and 8 are vertical sectional views through the subject machine taken in the planes of lines 7—7 and 8—8 respectively of FIG. 6.

FIG. 9 is a plan view of a portion of the pineapple feed means which introduces fruit into means for gripping the same during transfer thereof between predetermined stations.

FIG. 10 is an elevational view of a portion of the means for gripping the pineapple during transfer thereof.

FIG. 11 is a vertical sectional view through the gripping means taken in the plane of line 11—11 of FIG. 10.

FIG. 12 is a vertical sectional view corresponding generally to FIG. 11 illustrating details of an expansible pocket structure of the gripping means with a pineapple securely held therein.

FIG. 13 is a side elevational view of a rotary knife assembly for skinning one end of a pineapple and contouring the meat thereat.

FIG. 14 is a front elevational view of the knife assembly taken in the plane of line 14—14 of FIG. 13.

FIG. 15 is a side elevational view of another rotary knife assembly for skinning and contouring the opposite end of a pineapple.

FIG. 16 is a front elevational view taken in the plane of line 16—16 of FIG. 15.

FIG. 17 is a plan view, somewhat schematic in nature, illustrating details of the means for coring pineapple.

FIG. 18 is a side elevational view of a portion of the machine illustrating details of means for trimming pineapple to a predetermined length and for spacedly positioning opposed cutter assemblies in accordance with such predetermined length.

FIG. 19 is a side elevational view of a portion of the machine illustrating the inter-relationship between various sub-assemblies of the machine.

FIG. 20 is a plan view of a portion of the cylindrical cutter means of the subject machine in which a pineapple is cut and sized to cylindrical form.

FIG. 21 is a vertical sectional view through the cylindrical cutter assembly taken in the plane of line 21—21 of FIG. 20.

FIG. 22 is a front elevational view of a cylindrical cutter assembly taken in the plane of line 22—22 of FIG. 21.

DESCRIPTION OF THE PREFERRED EMBODIMENT

Before describing in detail the machine embodied in the subject invention, reference is directed to the generally schematic showings of FIGS. 1 and 2 which illustrate the successive treating steps of the subject method and the successive stations of the subject machine.

The procedural steps by which the pineapple are treated are seen in FIG. 1. Step 1 illustrates gripping a pineapple 1 intermediate its ends to center its axis. Such centering and gripping is effected in a pocket structure, generally designated 2, which is expansible inwardly utilizing the construction and procedures to be described hereinafter. Each pineapple fed from a supply is positioned in a contracted pocket structure and its longitudinal axis is centered therein automatically as the pocket structure is expanded by introducing fluid, such as air, thereinto to inflate the same. In the preferred embodiment to be described, such pocket structure preferably forms part of a rotatable turret.

In Step 2, the opposite crown and butt ends of the pineapple are skinned and the exposed meat is contoured to a predetermined shape. The skin is peeled from the pineapple ends in segments designated 3 and the meat is shaped generally into the form of frustums of cones having a slight central depression therein due to the particular configuration of the means employed to effect for such end contouring. The skin segments 3 removed from the ends may be utilized in bran or sugar recovery operations in known fashion.

In Step 3 the pineapple is cored to remove an elongated cylindrical segment 4 therefrom leaving a central opening 6 through the fruit. Suitable coring means is utilized as will be described. The core segment 4 may be utilized for juice production or solid or crushed fruit pack in known fashion.

In Step 4, the fruit is trimmed to predetermined length by removing end trim segments 7 of fresh meat from the contoured ends, which segments may be used for solid or crushed fruit pack in known fashion. In that regard, the fruit is end trimmed to length along planes transverse to its longitudinal axis to a predetermined length which is in multiples of the predetermined thickness of the individual slices ultimately to be cut from the fruit. The predetermined length to which the fruit are trimmed is determined in relationship to the overall unskinned length of individual fruit as will be described.

In Step 5, the external grip on the fruit by the pocket structure 2 is released by deflating the pocket structure and the fruit is thereafter supported internally by mandrel supporting means designated 8 inserted within the cored opening 6 therein. The mandrel means effects removal of the fruit from the pocket structure and transfers the fruit to its next treating step.

In Step 6, the remaining skin of the pineapple is removed and the skin segments 9 are routed to bran or sugar recovery operations in known fashion. The skin removal step exposes the remaining fresh meat of the fruit and cuts the fruit into a cylindrical form as noted.

Steps 7 and 8 are sequential cutting and sizing operations in which the skinned fruit cylinder is reduced to predetermined diameter determined by the canning program planned therefor. The respective fresh meat segments 11 and 12 removed from the fruit as it is cut to size are used for crushed fruit, solid pack, or juice in known fashion.

The final Step 9 in the illustrated procedure entails sorting of the fruit cylinders by grades, with a first grade generally being routed to a slicing and can filling or freezing operation, a second grade being routed to other types of solid packs, such as tid bits, chunks and the like, and with a lower grade being diverted to hand trimming and other operations for recovery of various types of solid fruit pack, in line with known procedures.

The method summarized has important advantages over conventional methods for preparing fresh pineapple and like fruits. For pineapple of comparable quality, the present method makes possible a greater recovery in the form of solid pack meat. That is, more meat is available for packing in the form of slices and like high quality solids, part of which heretofore was lost to fruit juice or surgar recovery. Additionally, the subject method produces a higher yield of first grade meat in an automatic procedure in which all the steps leading up to final sorting may be effected without manual handling.

The preferred embodiment of the machine for automatically carrying out the previously described method is schematically illustrated in FIG. 2. Such machine includes a plurality of predetermined stations at each of which a specific operation is performed. In most instances, such procedural steps are effected while a fruit is temporarily indexed at a predetermined station although certain operations lend themselves to being carried out while the fruit is moving between adjacent stations.

As noted from FIG. 2, a substantially continuous supply of fresh pineapple 1 is introduced into the machine by feed means which includes an intermittently moving infeed conveyor 13 and extensible and retractable plunger means 14 at a first station which inserts fruit in sequence from the infeed conveyor into the aforementioned inflatable pocket structures. Such pocket structures comprise part of a rotatable turret, designated 16, adapted to transport a plurality of pineapple in sequence between the stations of the machine. The infeed plunger means 14 positions each pineapple into a pocket structure indexed at the first station and such means is automatically retracted as the pineapple strikes a control stop plate 17 positioned at the first station.

As the turret 16 indexes in sequence, each successive pineapple is carried to and positioned at a second station at which an end peeling and contouring step is performed by a pair of opposed spaced rotary knife assemblies, designated 18 and 19, to remove skin segments 3 from the crown and butt ends and to contour such ends as noted previously.

The contoured pineapple are then indexed in sequence by the turret at a third station at which coring tube means, generally designated 21, is forced longitudinally through the pineapple. The cores 4 removed from the fruit are urged through the coring means by succeeding cores and are discharged from an end thereof located adjacent the third station.

The cored pineapple are carried in sequence by the turret past end cutting means at a fourth station in which end meat segments 7 are trimmed therefrom to size each pineapple to a predetermined length. Such length trimming is effected by opposed spaced rotary cutter assemblies, designated 23 and 24, the lateral positioning between which is automatically gaged by sensing means to be described. Such sensing means spaces such cutter assemblies from each other so that each fruit carried therebetween is cut to a predetermined length in multiples of the predetermined thickness of individual slices to be cut therefrom prior to packing.

Following sizing to length, the pineapple are indexed in sequence at a fifth station at which the external grip thereon by the respective turret pocket structure is released and the same are thereafter internally supported by the aforementioned mandrel means 8. Such mandrel means is inserted longitudinally into each successive pineapple at the fifth station and is utilized to transfer the same from the fifth station toward a sixth station where final skin removal and sizing of the fruit to diameter is effected. Such mandrel means is reciprocally extended and retracted in accordance with the indexing of successive fruit at the fifth station.

At the sixth station, a cutter means is provided in the form of a series of in line cylindrical cutter assemblies designated 26, 27 and 28. Each such cylindrical cutter assembly is substantially different from its preceding aligned cutter in the size of the central opening therethrough. Provided in association with the respective cylindrical cutter assemblies are splitter knife structures, designated 29, 31 and 32 which separate the removed skin meat into respective segments 9, 11 and 12. In that connection, it should be understood that reciprocal mandrel means 8 urges each succeeding pineapple through the cutter assemblies by forcing the same against a preceding pineapple. While three sequential cutting operations are illustrated, it should be understood that alternate arrangements including more than or fewer than three cutting steps may be employed if found suitable for a particular need. Following discharge of the successive sized fruit cylinders from the cylindrical cutter 28, the cylinders are sorted and handled as described previously.

The turret illustrated also includes another intermediate station between the aforementioned fourth and fifth stations at which an inspection and automatic reject operation may be utilized to reject poor quality fruit. However, in the sequence and machine noted, such intermediate station is a rest station at which no operation is specifically effected.

It should be understood that while the preferred sequence of operations described herein has been found effective, rearrangement of the various sequential treating steps is contemplated to meet particular needs and is considered within the scope of this invention.

As perhaps best seen in FIGS. 5 and 6, the supporting frame work of the machine upon which the various component subassemblies herein described are mounted includes a pair of longitudinal spaced main horizontal frame members 36 and 37 from which depend a series of space supporting leg structures 38, 39 and 41 seen in dotted lines in FIG. 6. Projecting above the horizontal frame members at spaced locations along the length thereof are a series of upright frame members 42, 43, 44, 46 and 47. The respective horizontal and upright frame members and the leg structures may be integrally connected into a rigid frame work in any known fashion, such as by bolting or welding. The frame work also includes other transverse frame members not specifically identified which are positioned in known fashion to help support the various sub-assemblies of the machine.

As noted from FIGS. 2, 4, 5 and 7 the infeed conveyor 13 comprises an endless metallic or non-metallic belt 51 in which individual pineapple are spacedly positioned for presentation to the turret at the first station. In known fashion, such belt passes around spaced drive pulley wheels 52 one of which is shown at FIG. 4 and at least one of which is driven by the power train of the machine to be described. Pineapple are positioned in troughs formed transversely of the conveyor belt 51 in any suitable manner, such as by automatic feeding machinery or by hand. Preferably the fruit placed on the conveyor belt has been sorted and segregated according to size by diameter so that all pineapple fed to a particular machine are generally of the same circumferential size. Such sorting by diameter minimizes waste in conjunction with the subject procedure. Sorting and segregating by length is not required because the subject machine may accommodate pineapple of substantially varied lengths, as will be described, without creating unwanted waste. Preferably, the pineapple are oriented on the conveyor belt with their butt ends positioned to enter into the turret first.

As best seen from FIGS. 4 and 5, individual pineapple pass from the conveyor belt beneath a guide plate 53 supported by a transverse bar 55 which in turn is supported by the frame work of the infeed conveyor. Each pineapple passes between the end of the conveyor and guide plate 53 and drops onto a curved cradle 54

(FIGS. 2 and 7) from which it is inserted into a pocket structure 2 of turret 16. The infeed conveyor is driven intermittently in timed relationship with indexing of the turret so that a pocket structure is presented to the first station as a pineapple is positioned in the cradle.

Substantially simultaneously with a pineapple being positioned in the cradle, infeed plunger 14 is extended by means of a suitable fluid (hydraulic or air) cylinder 56 (FIG. 9) into engagement with the crown end of the fruit in the cradle. Such pineapple is urged by the plunger laterally from the cradle into the pocket structure 2 indexed at the first station while such pocket structure is contracted. The plunger moves the pineapple until the butt end thereof strikes the aforementioned stop plate 17 adjustably mounted for selective lateral positioning relative to a frame member of the machine as seen in FIG. 9.

The pineapple preferably are fed into the pocket structure with their butt ends leading so that the more gradually tapered crown ends thereof may be inserted first through the cylindrical cutters in the final sizing operation. As the butt end of the fruit comes in contact with stop plate 17, it strikes a pneumatic switch 57 which transmits, through a suitable control circuit, a signal to the cylinder 56 to automatically effect immediate retraction of the plunger.

As noted previously, each fluid expansible or inflatable pocket structure 2 comprises a portion of the rotatable turret 16 which in the embodiment illustrated includes five pocket structures therein as seen in FIGS. 7 and 8. While hydraulic expansion fluid may be employed, pneumatic fluid (preferably air) is utilized in the embodiment disclosed herein.

The construction of the individual pocket structures is best seen in FIGS. 10 through 12. Each pocket structure includes an annular supporting flange 58 having a series of spaced apertures 59 therein through which conventional nut and bolt fastener assemblies 61 extend to secure the pocket structure in an apertured round point star ring 62 which defines the main supporting member of the turret. Flange 58 in turn has a recessed supporting ring 63 positioned to extend through a central opening in the flange and the supporting ring and flange are secured together as an integral unit in any suitable fashion such as by welding.

Supporting ring 63 as best seen in FIG. 11 has enlarged opposed inwardly directed annular rims 64 and 66 at its opposite edges which together define an annular recess 67 within the ring. A fitting 68 is positioned to extend through the supporting ring into communication with recess 67 and the fitting in turn is connected by a conduit 69 with a suitable source of inflating fluid, preferably air under pressure.

An annular elastic membrane 71 of rubber or the like is positioned to extend between rims 64 and 66 and encloses recess 67. The membrane is selectively inflated to grasp a pineapple positioned therein. Membrane 71 includes edge margins 72 and 73 which are folded back over the annular rims to overlie outer edge portions of the supporting ring 63. Conventional band or strap couplings 74 surround the edge margins of the membrane and secure the same in leak proof fashion to the supporting ring as shown.

It has been found desirable to insure effective gripping of pineapple by the pocket structures to cause the membrane when inflated to assume the configuration of a torose having alternate depressions and protuberances. Such torose effect is produced by utilizing clip means for cooperating with the clamps 74 for maintaining the membrane on the supporting ring in the position noted. Such clip means comprises a central internal metal annular band 76 with which a series of laterally extending resilient metal clip bands 77 are integrally connected, such as by welding, into a unitary assembly. Each of the clip bands 77 terminates at its opposite ends in hook shaped portions 78 formed to conform with the general contour of rims 64 and 66 of supporting ring 63 so that such band ends may be snugly engaged with the annular rims to help maintain the membrane in place.

Upon introduction of pneumatic fluid into recess 67, the bands 76 and 77 permit expansion of the membrane at only those locations lying between adjacent band sections so that the torose effect desired is produced. As seen in FIG. 12, a pineapple positioned in the pocket structure is securely gripped by the expanded portions of the membrane so that the fruit may be securely held therein against longitudinal shifting while the same is subjected to the sequential operations performed by the machine. The lateral bands 77 also facilitate sliding insertion of a pineapple into the pocket structure by the aforementioned feed mandrel 14. The torose effect produced by the structure described also has the important advantage of automatically centering a pineapple in the pocket structure as the membrane is expanded.

Pneumatic fluid introduced into the pocket structure through fitting 68 and conduit 69 is exhausted therefrom through the same channels. Alternate inflation and deflation of the respective pocket structures is effected at the first and fifth stations mentioned to permit gripping and release of fruit thereat. Such inflation and deflation is produced automatically by a valve structure designated 78 in FIGS. 4, 5 and 19. Such valve structure is of any conventional construction and automatically regulates in known fashion the introduction of air into and removal of air from the respective pocket structures as required during the operation of the machine.

It has been found desirable to also provide safety exhaust means in conjunction with each pocket structure so that a membrane may be deflated selectively if required during operation of the machine, such as if for some reason a shut down of the machine were required for maintenance problems. In such case, removal of individual pineapples from a given pocket structure would be desirable. For that purpose, an exhaust petcock fitting 79 is positioned through the supporting ring in communication with recess 67 so that, when the control handle 80 of the petcock is suitably positioned, the pocket structure may be deflated to permit removal of a pineapple therefrom.

As perhaps best noted from FIGS. 4, 7 and 8, the turret main ring 62 is supported by a bearing assembly 81 and reinforcing fins 82 are interposed between the bearing assembly and the main ring 62. The bearing assembly in turn is mounted on a rotatable shaft 83 which extends between and is rotatably supported in opposed pillow blocks 84 and 86 secured to frame members 47 and 46. Rotation of the turret is effected from a main power source through the power train to be described which indexes the turret sequentially at the successive stations as noted previously.

At the second station, end contouring means, defined by the aforementioned pair of opposed spaced rotary knife assemblies 18 and 19, is provided to effect skin removal from the opposite ends of the fruit. Details of such rotary knife assemblies are best seen in FIGS. 13 through 16 taken in conjunction with FIGS. 3 and 19.

The rotary cutter assemblies 18 and 19 are of substantially similar construction, the differences therebetween being dictated by their respective functions in contouring the respective butt end and crown end of a pineapple. Assembly 18 comprises an air or electric motor 87 which rotates a drive shaft 88 on which a cutter knife 89 is mounted. Knife 89 may include one or more blades which are contoured in accordance with the configuration to be formed in the meat of the butt end of the pineapple which preferably is frusto-conical as noted in Step 3 of FIG. 1. Motor 87 is bolted or otherwise secured to a dovetail slide 91 slidably received within a recessed mounting plate 92 which in turn is secured in any suitable fashion to the upright frame member 47 of the machine. Slide 91 includes a depending flange 93 which is operatively connected with the piston rod 94 of a hydraulic or pneumatic cylinder 96 (an air cylinder is employed in the disclosed embodiment) mounted beneath plate 92. Upon actuation of the cylinder, the piston rod is selectively extended or retracted in known fashion to extend or retract the slide and motor thereon. The motor 87 and cylinder 96 are connected with a suitable power source, such as an air supply (not shown), in known fashion. An enclosed guard 95 preferably surrounds knife 89 for safety.

Knife assembly 19 includes an air or electric motor 97 which rotates a drive shaft 98 on which a contoured cutter knife 99 is mounted. Knife 99 preferably corresponds in blade to the construction of aforementioned knife 89. Motor 97 is bolted or otherwise secured to a dovetail slide 101 slidably received in a recessed mounting plate 102 which in turn is secured in any suitable fashion to upright frame member 44 of the machine. A flange 103 depends from dovetail slide 101 and is operatively connected with a piston rod 104 of a hydraulic or pneumatic cylinder 106 secured beneath the mounting plate 102. Upon introduction of fluid (air, in the disclosed embodiment) into cylinder 106 the dovetail slide 101 may be advanced or retracted as desired. Motor 97 and cylinder 106 are connected with the aforementioned power sources (such as the exemplary air supply) in known fashion. Knife 99 is contoured to form the crown end of a pineapple into frusto-conical shape and, in that regard, is of smaller size than previously mentioned knife 89 which is designed to contour the larger butt end of the fruit. An enclosed movable guard 105 preferably surrounds knife 99 for safety.

A coil spring 107 (FIG. 13) surrounds shaft 98 on which knife 99 is mounted. Such spring is interposed between a block 108 fixed to guard 105 and a front mounting plate 109 of air motor 97. Spring 98 normally urges the guard away from the air motor and maintains the guard in a predetermined location when the knife is out of contact with a pineapple.

Projecting from the front of the motor assembly is a gaging ring 111 secured by spaced rods 110 to guard 105 so as to be movable therewith. As knife 99 is advanced by piston 106, but before its blades engage the fruit, the gaging ring contacts the crown end of the fruit. Spring 107 permits the knife to continue to advance relative to the fruit while the forward movement of the ring is impeded by its contact with the pineapple. Such relative movement between the knife and gaging ring causes slide rods 112 connected with the ring and guiding the same in suitable supports to move rearwardly carrying a transverse plate 115 mounted thereon into contact with a switch 113 of a control unit 114. Plate 115 includes a switch contact rod 115 (FIG. 13) which trips switch 113 as the gaging ring is depressed.

The control unit reverses the flow of air into cylinder 106 and causes the knife to be retracted. The spring 107 effects repositioning of the gaging ring for contact with a subsequent pineapple presented thereto. The action of the gaging ring is controlled so that the cutter knife 99 advances approximately one-half inch after the gaging ring contacts the crown end of the fruit so that the desired amount of skin removal and end contouring is effected automatically. The control unit 114 transmits a control signal to the cylinder 106 for effecting its action in known fashion.

Because each pineapple introduced into turret 16 is initially positioned against fixed stop plate 17 mentioned previously, a gaging mechanism is not required in conjunction with knife assembly 18 which contours the butt end of the fruit. Such contouring is effected by setting the movement of cutter knife 89 for retraction by its associated cylinder 96 following advance approximately one-half inch after it first contacts the fruit. Movement is reversed automatically in conjunction with reversal of the direction of the crown end cutter assembly 19 when the crown end assembly is retracted by means of the control unit 114.

The means for coring successive pineapple as they are indexed at the third station by the turret is shown in FIGS. 17 and 18 taken in conjunction with FIGS. 3 and 5. The operation of the aforementioned coring tube 21 is best seen in FIG. 17 as a pocket structure holds a pineapple in position for coring. The turret structure has been omitted from that figure for purposes of clarity of illustration. Coring tube 21 is hollow and elongated and includes a sharpened cutting edge 116. So that the tube may be repositioned for maximum utilization, its opposite end 117 also is provided with a sharpened cutting edge.

The coring tube is selectively advanced and retracted by a fluid cylinder 118 (a hydraulic cylinder being employed in the disclosed embodiment), see FIGS. 3 and 18, which has its piston rod 119 operatively connected with a generally L-shaped plate 121 to which is secured a mounting block 122 through which coring tube 21 extends and in which the coring tube is fixedly secured in any suitable fashion. Thus, upon extension of piston rod 119, the coring tube may be moved to the left in FIGS. 17 and 18 to force the same through a pineapple indexed at the third station by the turret. A backup plate 123 having a hole 124 therein to accommodate the coring tube therethrough is mounted at the third station and the butt end of each pineapple is positioned in contact with the backup plate to assist in maintaining the pineapple in proper position during the coring operation. The backup plate is secured to the machine frame work in any suitable fashion. Retraction of the tube is effected automatically as the piston rod 119 reaches the limits of its predetermined stroke.

As the coring tube is extended and forced through a pineapple by the cylinder 118, the removed core enters the tube interior and is withdrawn from the pineapple within the tube as the tube is retracted. Extension and retraction of the piston is controlled by conventional known control means not shown. As the coring tube is successively extended and retracted relative to the turret to remove cores from successive pineapple indexed at the third station, each successive core enters the tube and urges preceding cores therethrough to be discharged from end 117 of the tube as schematically shown in FIG. 2.

As each cored pineapple is carried by the turret past a fourth station, the pineapple is cut to predetermined length by the opposed spaced cutter assemblies 23 and 24 mentioned previously. Note FIGS. 4, 6 and 18. While the actual cutting of the opposite ends of the pineapple may be effected by various devices, in the illustrated embodiment the cutter assemblies comprise a pair of rotatable knife edged cutter wheels 126 and 127 which are selectively positionable relative to each other.

Cutter wheel 126 is mounted on a rotatable shaft 128 which is rotated at high speed by an air or electric motor 129 mounted on a bracket 131 which in turn is secured to the upright frame member 47. Cutter wheel 126 is positioned to cut approximately 1 inch from the butt end of a pineapple and the same is fixedly located relative to the fixed path followed by the butt end of each pineapple carried therepast. The opposite cutter wheel 127 is moveably mounted to permit the spacing between the two cutter wheels to be varied as required in accordance with the variable lengths of pineapple presented thereto.

Length sensing means is provided in conjunction with cutter wheel 127 for advancing or retracting the same relative to cutter wheel 126. Wheel 127 is mounted upon and rotated with a shaft 132 driven from the power train as will be described. As best seen from FIG. 18, shaft 132 extends through a drive tube 133 which is rotatable in spaced bearings 134 and 136 mounted to the frame members of the machine. Shaft 132 is longitudinally slidable within tube 133 and is keyed to tube 133 for rotation therewith as the tube is rotated by the power train.

Extension or retraction of shaft 132 and the cutter wheel 127 therewith is effected by a mechanism activated by the aforementioned sensing means which gages the length of each fruit to be cut at the fourth station. In that regard, such sensing means includes a sensing ring 137 which is positioned at the third station in conjunction with the aforementioned coring tube 21. The sensing ring is operatively connected with the cutter assembly 24 by positioning mechanism which moves cutter wheel 127 in accordance with positioning of the sensing ring. As best seen in FIGS. 3 and 18, a piston rod 138 is connected by a vertical link 139 with the sensing ring and such rod is actuated selectively by a hydraulic fluid cylinder 141 suitably mounted to the machine framework.

The sensing ring and its associated positioning mechanism function as follows. As coring tube 21 is advanced by its associated air cylinder 118 to engage a fruit at the third station, hydraulic cylinder 141 is simultaneously activated to move the sensing ring until the ring strikes the crown end of a pineapple. The effect of the displacement of the substantially incompressible fluid from the cylinder 141 is transferred to an associated hydraulic cylinder 142 (FIGS. 4 and 18) which positions cutter wheel 127 as will presently be described.

The wheel positioning mechanism further includes a rotary holding cam 146 which has a series of parallel grooves 147 formed along its length over a portion of its periphery. The holding cam is rotatable during operation of the machine by the power train as will be described hereinafter. A knife edged sensing wheel 148 is rotatably mounted in the lower end 149 of a connecting link 151 which in turn is operatively connected at its upper end by an extension 152 of shaft 132 which is longitudinally slidable within the rotatable drive tube 133 mentioned previously. Upon movement of link 151 towards the left or right in FIG. 18, the cutter wheel 127 may be positioned closer to or farther away from the opposed cutter wheel 126.

Such movement is effected by a piston rod 153 actuated by the aforementioned piston 142 which is responsive to transfer of fluid from the gaging ring actuating piston 141 as previously mentioned. Piston rod 153 is bolted to link 151 for effecting extension or retraction of the link in response to forward or reverse actuation of the piston 142.

The centers of grooves 147 in holding cam 146 are spaced from each other in multiples of the predetermined thickness of individual slices to be cut from the fruit following its discharge from the subject machine. As the holding cam rotates, the sensing wheel 148 is periodically engaged with one of the grooves of the holding cam which automatically locates and fine-positions cutter wheel 127 to cut a given pineapple to a predetermined length corresponding to even multiples of such slice thickness.

Upon completion of the pineapple end cutting to predetermined length as the same is carried between the cutter wheels 126 and 127, the holding cam is rotated to a position where the grooves 147 are free of engagement with the sensing wheel 148 so that such wheel clears contact with the cam grooves, at which time fluid is introduced into the opposite end of the cylinder 142 to return the sensing mechanism components to their initial positions in which they are ready to sense the length of a succeeding pineapple and to again position the cutter wheel 127 as required.

Following cutting to length at the fourth station, the pineapple are indexed in sequence at an intermediate rest station resulting from construction of the illustrated turret which has five pocket structures therein. At such rest station it is contemplated that, if desired, a fruit reject mechanism may be employed for automatically rejecting below quality fruit in response to a control signal initiated by a visual inspector at such station, or automatically if quality sensing devices are satisfactorily developed for that purpose. In any event, following end trimming, the fruit is indexed by the turret at a fifth station beyond the rest station at which the external grip on the fruit is released and the same is thereafter supported internally during subsequent operations.

Referring to FIGS. 6 and 19 taken in conjunction with FIG. 3, as the turret is indexed at the fifth station the aforementioned mandrel means are extended into the opening formed when the fruit is cored. Upon such mandrel means being inserted into a pineapple, the pocket structure indexed at the fifth station is deflated to permit removal of the fruit therefrom. Such mandrel means includes aforementioned mandrel 8 which includes thereon a stop flange 156 which contacts the contoured butt end of the fruit when the mandrel is fully inserted therein. The mandrel is selectively extended and retracted by an air cylinder 157 in timed sequence with indexing of the turret at the fifth station to transfer each successive fruit from the fifth station to an adjacent sixth station at which the remaining skin is removed therefrom and sizing thereof to diameter is effected. It should be appreciated that mendrel 8 is rapidly reciprocated to pass through and be retracted from a pocket structure while the same is momentarily indexed at the fifth station.

At the mentioned sixth station, cylindrical cutter means are provided for removing the skin intermediate the contoured ends of the fruit and for forming the fruit to a cylinder of predetermined diameter in accordance with the size of containers intended for the fruit. In the illustrated embodiment, the aforementioned three in line rotatable cylinder cutters are utilized. First cutter 26 removes the outer skin from the fruit while the two successive cutters 27 and 28 decrease the size of the fruit to the predetermined cylindrical size. As noted from FIG. 4, each cylindrical cutter is rotated from the power train in the manner to be described hereinafter.

It should be understood that the successive cutters include rotating hollow elongated circular blades 161, 162 and 163, respectively, of decreasing internal diameter. The respective blades, with their associated main cutter housings, form a continuous cylindrical channel of stepped configuration through which successive pineapple are forced as each fruit is inserted into the first cutter 26 by mandrel 8. Thereafter the fruit are urged in end to end contact through the cylindrical cutters as noted.

It should be noted that if the fruit cylinders within the cutters show a tendency to rotate with the cutters, alternate cutters may be rotated in opposite direction to obviate such rotation of the fruit with the cutters to insure effective cutting.

Following discharge of the successive fruit from the final cutter 28 the same are carried on any suitable conveyor provided therefor to a slicing machine or other known packaging operation. It has been found that a suitable cooling fluid may be circulated within the cutter housings to prevent scorching of fruit during the sizing operation noted.

As noted previously, each cutter assembly includes a structure for splitting into segments those portions of the skin and meat separated by the successive cutters. Such structure comprises the aforementioned splitter knives 29, 31 and 32 which are provided above and below the respective rotating blades 161, 162 and 163 so that, as a fruit cylinder is urged longitudinally into the rotating cutters, the thin outer cylinders are split into the aforementioned skin and meat segments 9, 11 and 12 shown in schematic FIG. 2.

Except for differences in size, each of the cylindrical cutter assemblies is identical in construction and reference is directed to FIGS. 20 through 22 for constructional details thereof. In that connection the first cutter assembly 26 has been illustrated as examplary. Each such assembly includes a main non-rotatable housing 166 within which is rotatably mounted, via suitable bearing structure 167, an inner hollow cutter housing 168 from which the aforementioned circular blade 161 projects. Suitable bolt fasteners 169 connect the inner cutter housing 168 with a pulley wheel 171 secured to the end of the inner housing for rotating the same. The splitter knives 29 are connected with arcuate plates 172 which are bolted to the fixed housing 166 so that the cylindrical blade 161 rotates therein. The fixed housing 166 in turn is secured to an upright frame member 44 so that the cutter assembly is securely mounted for its intended purpose.

Reference is now directed to FIG. 4 which shows the synchronized power train utilized for activating in timed sequence the various components of the illustrated embodiment of the machine. A main power source 176 in the form of an electric motor or the like is supported on the machine frame work and actuates through a belt drive 177 a start-stop gear box mechanism 178 by means of which turret 16 and components associated therewith are driven in intermittent fashion in accordance with indexing of the turret at the respective stations noted. The aforementioned drive shaft 83 which rotates the turret 16 is connected by a suitable coupling 179 and intermediate drive with the gear box 178 so that the turret is indexed in the manner described.

A chain drive 181 is interposed between turret shaft 83 and the pulley wheel 52 over which infeed conveyor 51 passes so that actuation of the conveyor is timed with indexing of the turret.

A drive shaft 182 extends substantially the length of the machine and is actuated by another gear box 183 which in turn is actuated by a chain drive 184 passing over a shaft 186 driven from the main gear box 178 mentioned previously. At its opposite end, shaft 182 drives a chain 187 which in turn rotates the holding cam 146 periodically as noted.

The cylindrical cutter assemblies 26, 27 and 28 are actuated from a second main power source comprising an electric motor 191 mounted on the machine frame work which utilizes a belt drive 192 to rotate a drive shaft 193 extending longitudinally of the machine which in turn actuates belts 194, 195 and 196 which drive the respective inner rotatable cutter housings of each of the cutter assemblies as noted previously. Because the cylindrical cutters for sizing the pineapple preferably rotate constantly during operation of the machine, the separate power source noted is utilized. In that same connection a belt drive 197 connected with shaft 193 is utilized to continuously rotate the aforementioned drive tube 33 which actuates cutter wheel 127 of length cutter assembly 24.

While the control circuitry for regulating the respective electrical and air/hydraulic components of the apparatus previously described has not been illustrated herein, it should be understood that such control circuitry and the switching mechanisms utilized therewith are of a construction readily available in the art and installable by persons competent in that field.

As noted schematically from FIG. 6, means preferably is provided beneath and supported by the machine frame work for collecting the skin and meat cuttings and segments removed from the successive pineapple. Such means may include receptacles to be removed and replaced when full, but preferably such means comprises side by side endless belt conveyors 201, 202, 203 of suitable construction which catch and carry away such cuttings and segments to locations at which further treatment thereof is to be effected as noted previously.

While in the illustrated embodiment the machine is constructed so that such skin and meat cuttings and segment drop downwardly through the machine onto the collecting means, it is contemplated that other embodiments of the machine will have their components reoriented substantially 180° so that the respective knives and cutters described will be positioned generally on the underside of the machine rather than on the upperside to facilitate somewhat the collection and removal of such cuttings and segments.

Having thus made a full disclosure of the method and apparatus of this invention, attention is directed to the appended claims for the scope of protection to be afforded thereto.

I claim:

1. A method of preparing fresh pineapple or like fruit comprising
   A. positioning the fruit in an inflatable pocket structure and gripping said fruit intermediate its opposite ends by inflating said pocket structure,
   B. removing the skin from said opposite ends to expose the meat thereat,
   C. coring said fruit,
   D. trimming said cored fruit to a predetermined length,
   E. inserting a supporting mandrel through said cored fruit,
   F. releasing said grip on said cored fruit intermediate said ends by deflating said pocket structure,
   G. removing additional skin from said fruit between said opposite ends to expose the meat between said ends, and
   H. cutting said fruit to cylindrical form of predetermined diameter.

2. The method of claim 1 in which a series of fruit is prepared in sequence according to the steps recited.

3. A method of preparing a quantity of fresh pineapple or like fruit in sequence comprising
   A. providing a supply of fruit,
   B. introducing fruit individually and in sequence into a movable holder having a plurality of inflatable pockets therein,
   C. at a first station gripping the outer surface of each fruit introduced into an inflatable pocket of said holder intermediate the ends of such fruit by inflating the pocket in which said fruit is positioned,
   D. at a second station peeling opposite ends of each fruit while the same is gripped by said inflatable pocket to expose the meat at said ends,
   E. at a third station removing the core of each fruit to provide an opening therethrough extending between said opposite ends,
   F. at a fourth station trimming each cored fruit to predetermined length,
   G. at a fifth station supporting each cored fruit internally and releasing said grip on said outer surface thereof by deflating said pocket in which said fruit is positioned, and
   H. at a sixth station removing the remainder of the skin from each fruit while the same is supported internally to expose the meat between said ends and cutting each fruit to cylindrical contour of predetermined diameter.

4. The method of claim 3 in which said skin removal and cutting at said sixth station is effected in at least two successive steps.

5. The method of claim 3 in which each fruit is trimmed at said fourth station to a predetermined length which is in multiples of the predetermined thickness of slices to be cut from such fruit.

6. The method of claim 3 in which each fruit is trimmed to said predetermined length as the same is moving between said third and fifth stations.

7. The method of claim 3 in which each fruit is maintained temporarily stationary at each of said first, second, third and fifth stations during treatment thereof at such stations.

8. A method of preparing fresh pineapple or like fruit comprising
   A. providing a supply of fruit,
   B. providing a rotatable turret having a plurality of inflatable pockets therein,
   C. withdrawing successive fruit from said supply and introducing the same in sequence into successive pockets of said turret at a feeding station,
   D. centering successive fruit in sequence in said turret pockets at said feeding station and gripping the same for movement with said turret by inflating such pockets,
   E. indexing said turret to position successive gripped fruit in sequence at an end contouring station,
      1. peeling opposite ends of successive fruit in sequence at such contouring station to remove the skin and expose the meat at such ends,
   F. indexing said turret to position successive peeled fruit in sequence at a coring station,
      1. removing the core of successive fruit in sequence at such station to provide an opening longitudinally therethrough,
   G. indexing said turret to carry successive cored fruit past an end trimming station and to position each fruit in sequence at a mandrel inserting station,
      1. trimming successive fruit to a predetermined length in sequence as the same move in said turret past said end trimming station toward said mandrel inserting station,
      2. deflating each pocket of said turret in sequence as the same reaches such mandrel inserting station, and
      3. inserting a mandrel in sequence into the opening in each successive fruit as the same are indexed at such station,
   H. removing successive fruit in sequence from said turret on said mandrel and transferring the same to a cutting station, and
   I. removing the remaining skin from successive fruit in sequence and cutting each skinned fruit at said cutting station into cylindrical form of predetermined diameter.

9. The method of claim 8 in which successive fruit is cut to cylindrical form at said cutting station by forcing the same with said mandrel through at least one cylindrical cutter of predetermined size.

10. The method of claim 8 in which said skin removal and cutting at said cutting station are effected in at least two successive steps.

11. The method of claim 8 in which said fruit at said trimming station is cut to a predetermined length which is in multiples of the predetermined thickness of slices to be cut therefrom.

12. A method of preparing fresh pineapple or like fruit comprising

A. positioning a fruit in an inflatable pocket structure and gripping said fruit intermediate its opposite ends by inflating said pocket structure, B. removing the skin from said opposite ends of said fruit to expose the meat thereat, C. coring said fruit to provide a longitudal opening therethrough, D. trimming said cored fruit to a predetermined length, E. inserting a supporting mandrel into said cored fruit through the longitudal opening formed therein, F. releasing said grip on said cored fruit by deflating said pocket structure, and G. removing additional skin from said cored fruit between said opposite ends to expose the meat between said ends.

13. A method of preparing a quantity of fresh pineapple or like fruit in sequence comprising A. providing a supply of fruit, B. introducing fruit individually and in sequence into a movable holder having a plurality of inflatable pocket structures therein, C. at a first station gripping the outer surface of each fruit introduced into an inflatable pocket structure of said holder intermediate the ends of such fruit by inflating the pocket structure in which said fruit is positioned, D. at a second station peeling opposite ends of each fruit while the same is gripped in said inflatable pocket structure to expose the meat at said ends, E. at a third station removing the core of each fruit to provide an opening longitudinally therethrough extending between said opposite ends, F. at a fourth station trimming each cored fruit to a predetermined length.

G. at a fifth station supporting each cored fruit internally and releasing said grip on said outer surface thereof by deflating said pocket structure in which said fruit is positioned, and H. at a sixth station removing the remainder of the skin from each fruit while the same is supported internally to expose the meat between said opposite ends.

14. The method of claim 13 which further includes

I. cutting each fruit following removal of the skin from between the ends thereof to a generally cylindrical contour of predetermined diameter.

15. The method of claim 13 in which each fruit is trimmed at said fourth station to said predetermined length which is in multiples of the predetermined thickness of slices to be cut from such fruit, and in which said method further includes I. slicing each cored fruit into such predetermined number of slices.

* * * * *